United States Patent
Jose et al.

(10) Patent No.: US 11,521,599 B1
(45) Date of Patent: Dec. 6, 2022

(54) WAKEWORD DETECTION USING A NEURAL NETWORK

(71) Applicant: Amazon Technologies, Inc., Seattle, WA (US)

(72) Inventors: Christin Jose, Milpitas, CA (US); Yuriy Mishchenko, Lexington, MA (US); Anish N. Shah, Bedford, MA (US); Alex Escott, San Francisco, CA (US); Parind Shah, Chelmsford, MA (US); Shiv Naga Prasad Vitaladevuni, Belmont, MA (US); Thibaud Senechal, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 121 days.

(21) Appl. No.: 16/577,351

(22) Filed: Sep. 20, 2019

(51) Int. Cl.
G10L 15/16 (2006.01)
G06F 17/15 (2006.01)
G10L 15/06 (2013.01)
G10L 15/08 (2006.01)

(52) U.S. Cl.
CPC .............. G10L 15/16 (2013.01); G06F 17/15 (2013.01); G10L 15/063 (2013.01); *G10L 2015/088* (2013.01)

(58) Field of Classification Search
CPC . G10L 15/16; G10L 15/063; G10L 2015/088; G06F 17/15
See application file for complete search history.

(56) References Cited

U.S. PATENT DOCUMENTS

| | | | | |
|---|---|---|---|---|
| 10,032,451 | B1* | 7/2018 | Mamkina | G06F 21/32 |
| 10,074,371 | B1* | 9/2018 | Wang | G10L 15/30 |
| 10,079,015 | B1* | 9/2018 | Lockhart | G10L 15/08 |
| 2015/0095032 | A1* | 4/2015 | Li | G10L 15/083 704/255 |
| 2016/0283841 | A1* | 9/2016 | Sainath | G10L 15/16 |
| 2016/0379632 | A1* | 12/2016 | Hoffmeister | G10L 25/87 704/253 |
| 2017/0270919 | A1* | 9/2017 | Parthasarathi | G10L 15/02 |
| 2020/0034703 | A1* | 1/2020 | Fukuda | G06N 3/0454 |
| 2020/0184962 | A1* | 6/2020 | Chen | G10L 15/30 |
| 2020/0335088 | A1* | 10/2020 | Gao | H04R 3/04 |

FOREIGN PATENT DOCUMENTS

FR WO 2021030918 A1 * 7/2018 ........... G10L 15/063

OTHER PUBLICATIONS

Maekaku et al. Simultaneous Detection and Localization of a Wake-Up Word using Multi-Task Learning of the Duration and Endpoint, Sep. 15-19, 2019, INTERSPEECH 2019,Graz, Austria, pp. 4240-4244. (Year: 2019).*

* cited by examiner

*Primary Examiner* — Michelle M Koeth
*Assistant Examiner* — Darioush Agahi
(74) *Attorney, Agent, or Firm* — Pierce Atwood LLP

(57) ABSTRACT

A system and method performs wakeword detection using a feedforward neural network model. A first output of the model indicates when the wakeword appears on a right side of a first window of input audio data. A second output of the model indicates when the wakeword appears in the center of a second window of input audio data. A third output of the model indicates when the wakeword appears on a left side of a third window of input audio data. Using these outputs, the system and method determine a beginpoint and endpoint of the wakeword.

20 Claims, 14 Drawing Sheets

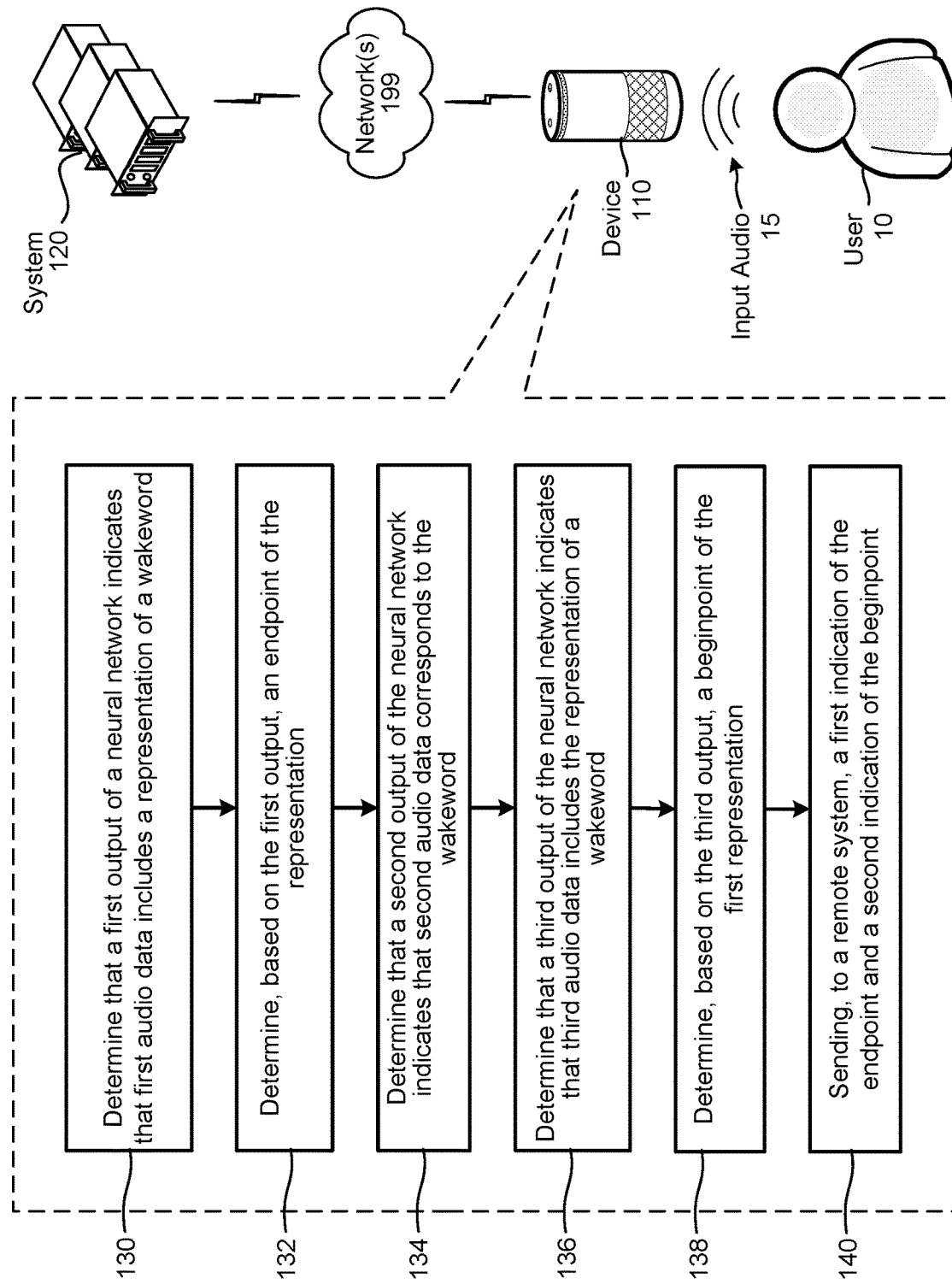

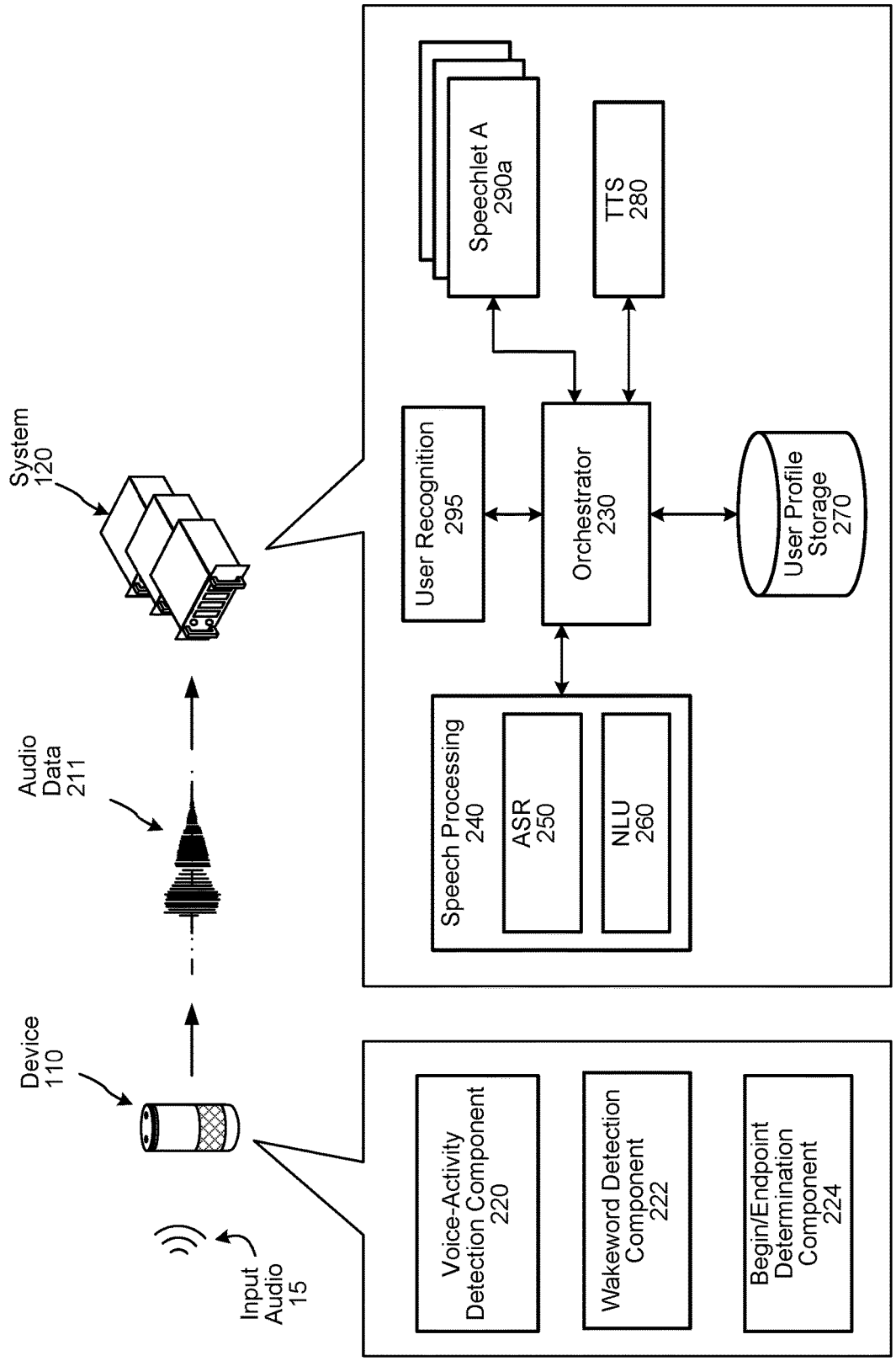

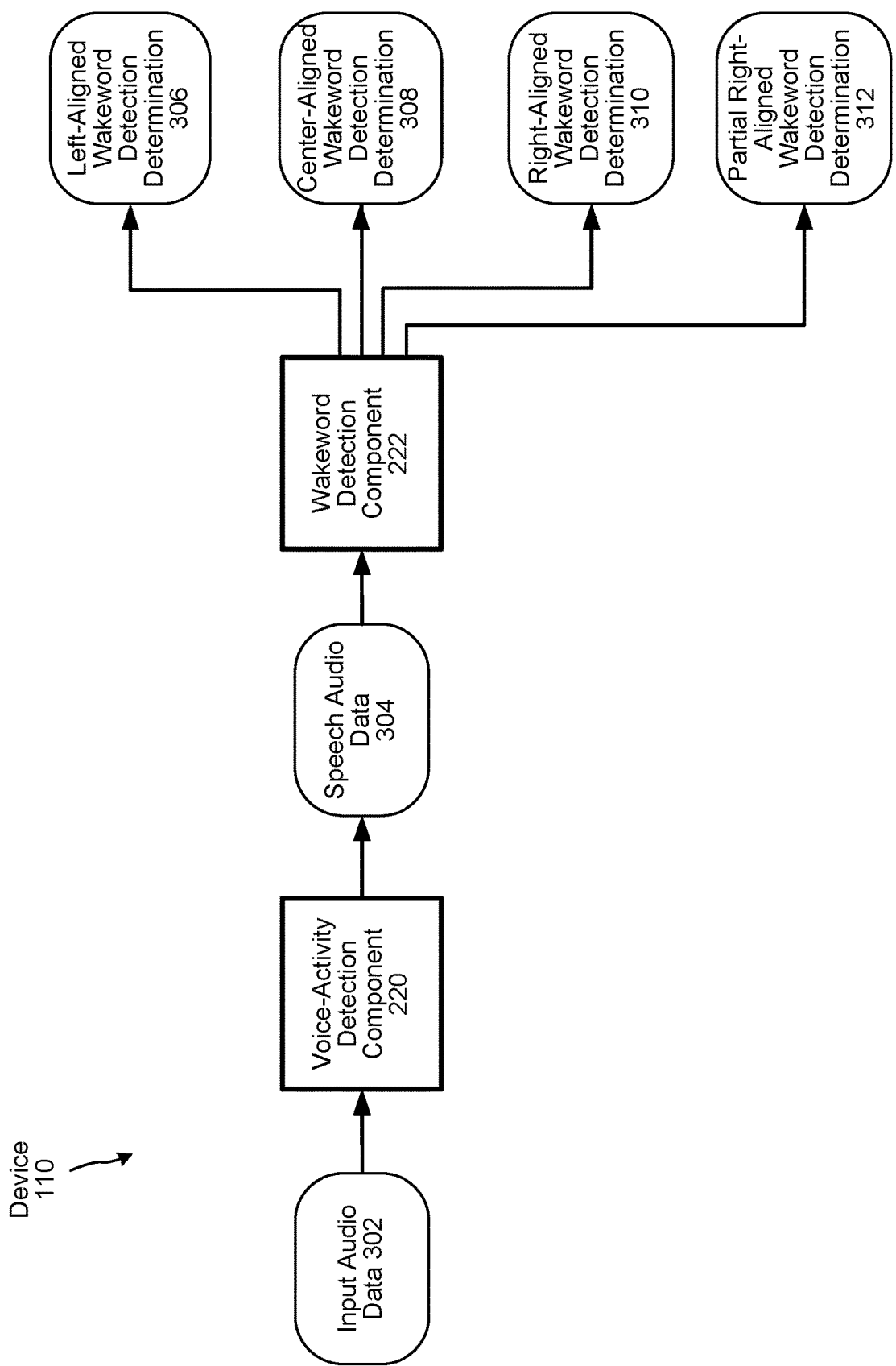

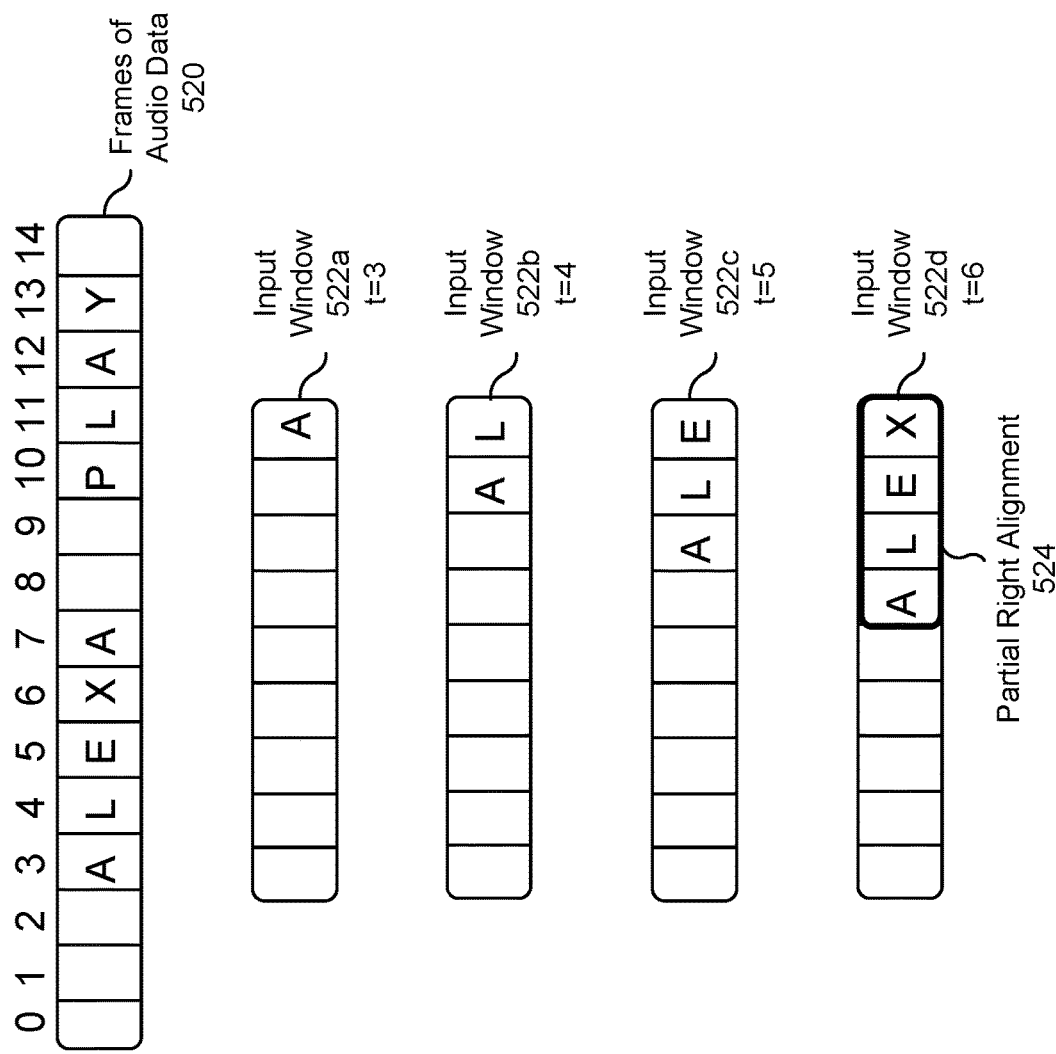

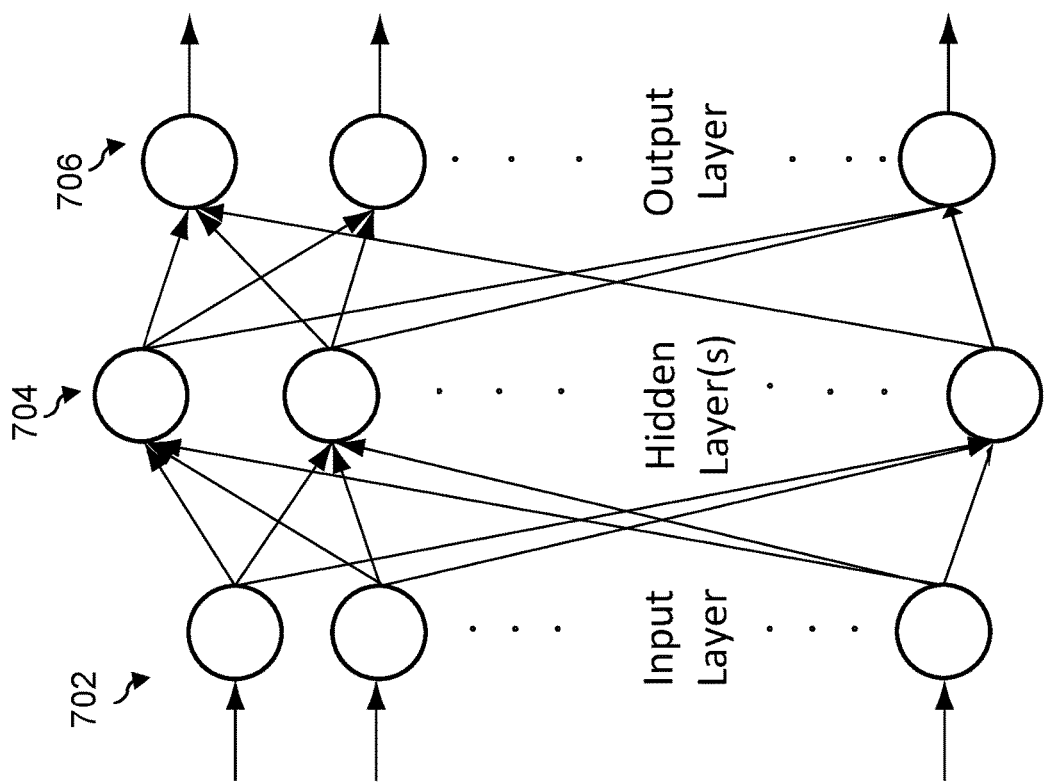

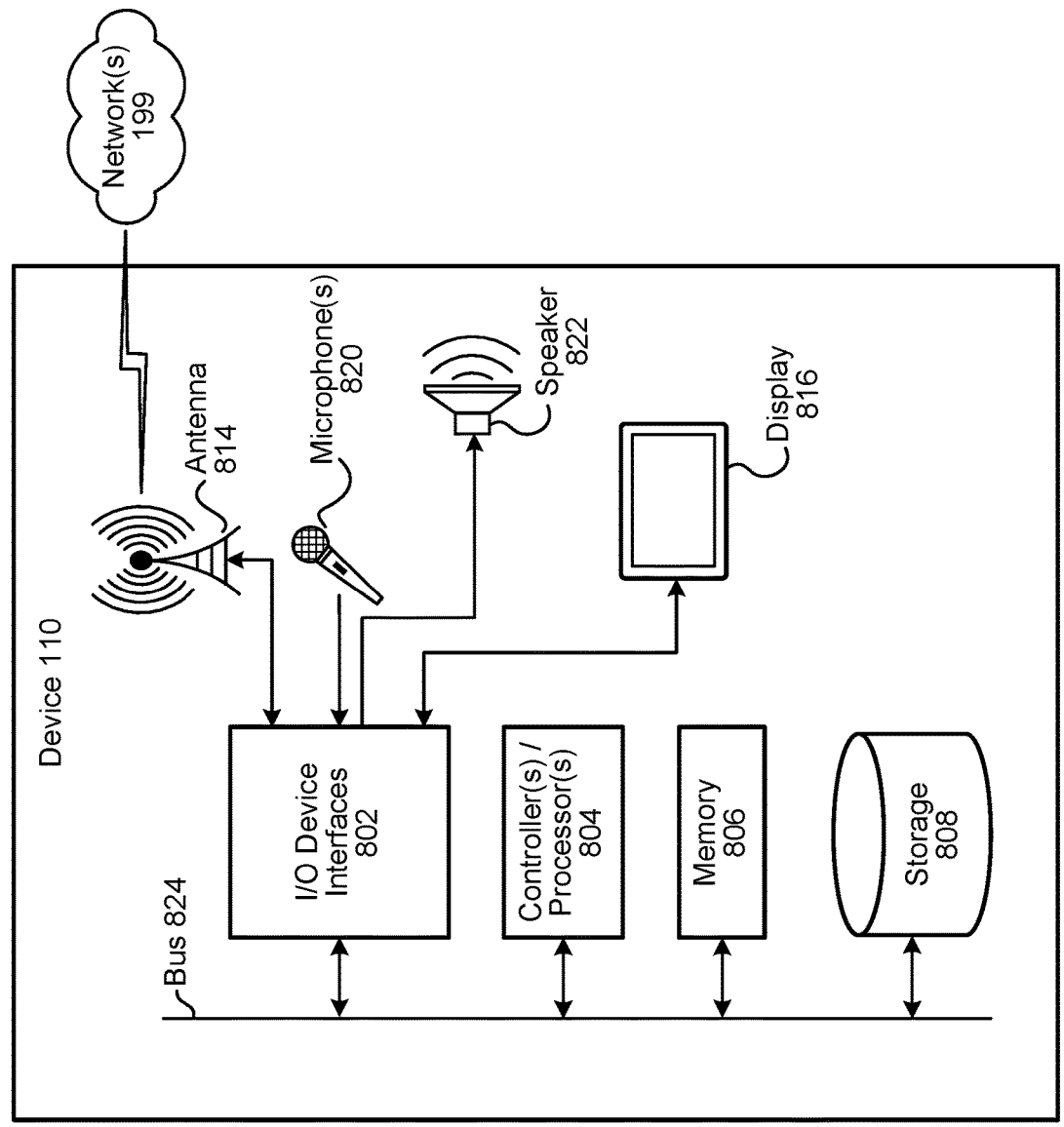

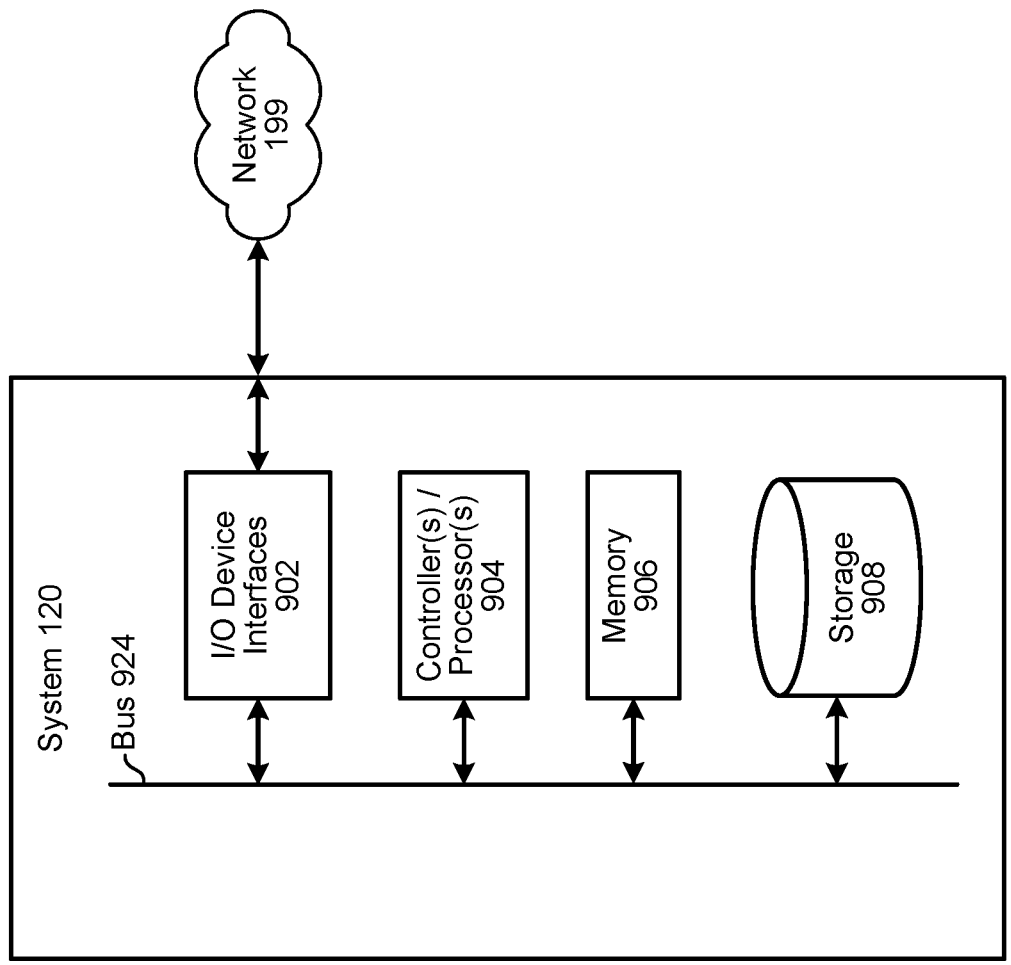

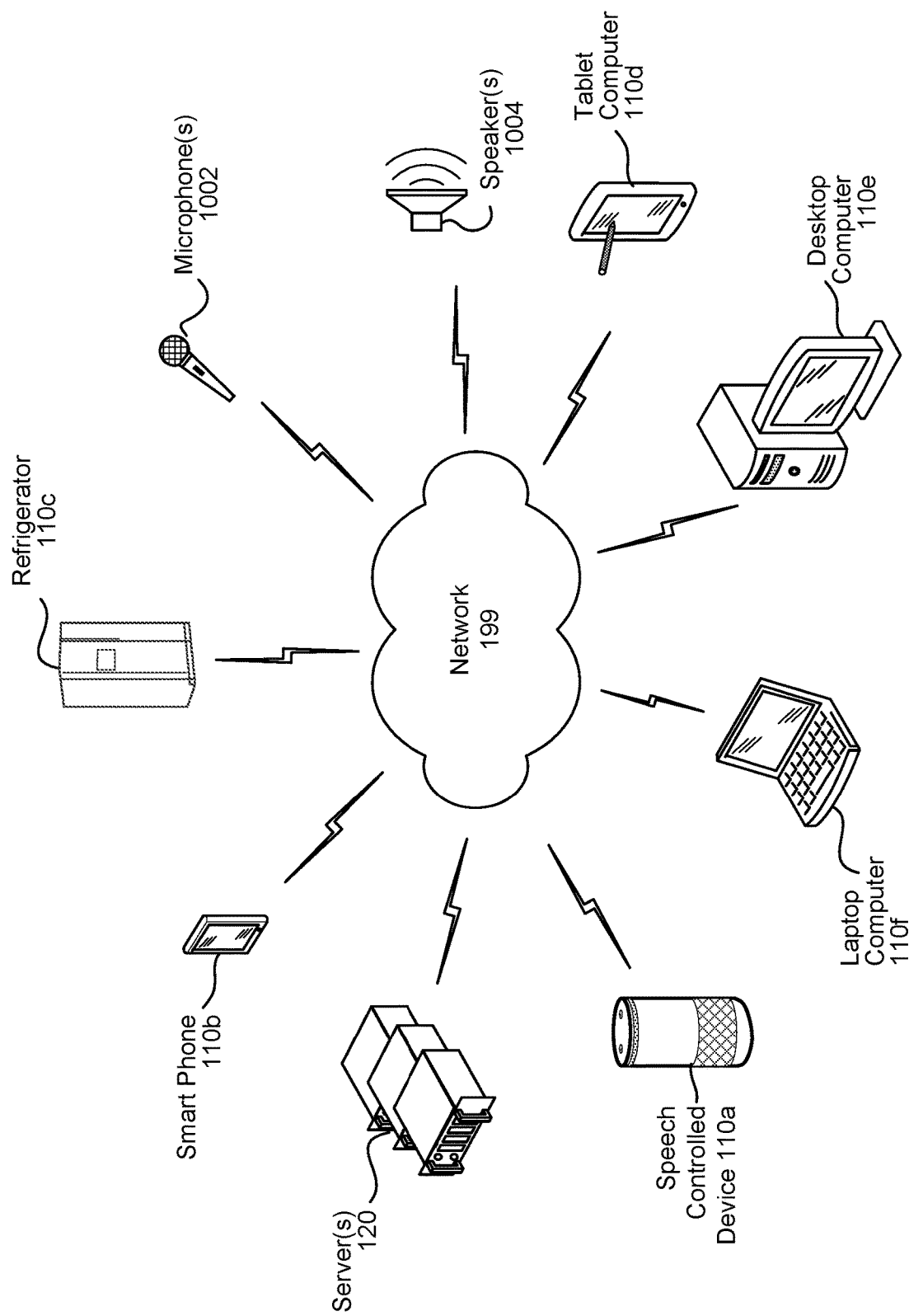

WAKEWORD DETECTION USING A NEURAL NETWORK

BACKGROUND

Speech-recognition systems allow humans to interact with computing devices using their voices. These systems use techniques to identify words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may involve converting a user's speech into text data which may then be provided to various text-based software applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system for detecting a wakeword in accordance with embodiments of the present disclosure.

FIG. 2 illustrates components of a system for detecting a wakeword and speech processing in accordance with embodiments of the present disclosure.

FIGS. 3A and 3B illustrate a system for detecting a wakeword in accordance with embodiments of the present disclosure.

FIGS. 5A and 5B illustrate windows of audio data for wakeword-detection model in accordance with embodiments of the present disclosure.

FIGS. 7A and 7B illustrate neural networks in accordance with embodiments of the present disclosure.

FIG. 8 illustrates components of a device in accordance with embodiments of the present disclosure.

FIG. 9 illustrates components of a server in accordance with embodiments of the present disclosure.

FIG. 10 illustrates a computer network for use with embodiments of the present disclosure.

DETAILED DESCRIPTION

Figure 3B:
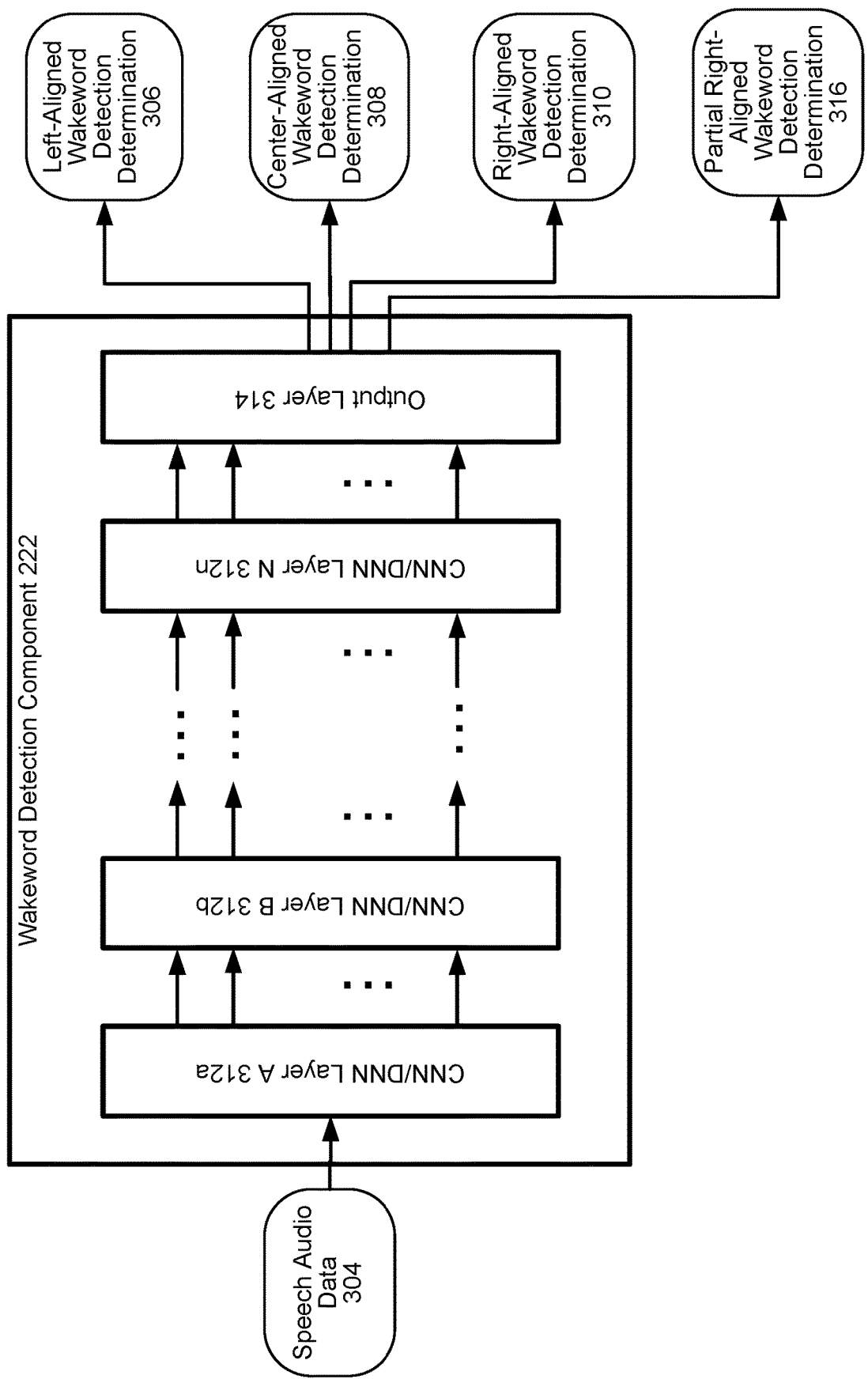

Automatic speech recognition (ASR) is a field of computer science, artificial intelligence, and linguistics involving transforming audio data associated with speech into text representative of that speech. Natural language understanding (NLU) is a field of computer science, artificial intelligence, and linguistics concerned with enabling computers to derive meaning from input data representing natural language (e.g., text data and/or audio data). ASR and NLU are often used together as part of a speech processing system.

A user device, such as a cellular telephone, table computer, or laptop computer, having one or more microphones may be configured to capture sounds including speech from a user and convert those sounds into an audio signal; the user device may then perform speech processing. In other embodiments, a distributed computing environment may be used to perform the speech processing. An example distributed environment may include the user device and a remote device; the user device may send audio data representing the speech to the remote device, which then performs some or all of the speech processing. A command represented in the audio data may then be executed by a combination of the remote system and/or the user device.

The user device and/or remote system may be configured to further process audio data upon a user speaking a particular word, phrase, and/or nonspeech sound—referred to collectively herein as a "wakeword"—to, e.g., send and/or process the audio data in expectation of the user speaking further words and/or sounds representing a command. Some components of the user device, such as a voice-activity detection (VAD) component (discussed in greater detail below) may continually listen for speech; upon detection of speech, the VAD component may cause the processing of the audio data using other components, such as a wakeword-detection component (also discussed in greater detail below). The wakeword may represent an indication for the system to perform further processing. For example, a system may be configured to detect a wakeword or other input and then process any subsequent audio following the wakeword or other input (and, in some embodiments, some amount of pre-wakeword audio) to detect any commands in the subsequent audio. As an example, a wakeword may include a name by which a user refers to a user device, a name of a different device, a name of an assistant, and/or a name of a skill. Thus, if the wakeword is "Alexa," a user may command a local voice-controlled device to play music by saying "Alexa, play some music now." The user device may continually receive and process audio to detect the wakeword. Upon the user device recognizing the wakeword "Alexa," the user device may process the subsequent audio (in this example, "play some music") to determine a command. Additionally or alternatively, the user device may send audio data representing the speech to the remote device to perform speech processing on that audio to determine the command for execution. Commands may include performing actions, rendering media, obtaining and/or providing information, and/or initiating Internet-based services on behalf of the user.

In certain circumstances, the user device may include its own ASR system for processing audio data to determine corresponding text data. The ASR system of the user device may, however, be configured to understand only a subset of all possible words that may be understood by an ASR system operating on one or more remote system(s) that is configured to understand a greater subset or all possible words. For example, an ASR system operating on the remote device(s) may be capable of detecting 10,000 different sounds corresponding to words or parts of words, or "acoustic units"; the ASR system of the user device, in contrast, may be capable of detecting only 3,000-4,000 acoustic units. The acoustic units may be, in some embodiments, phones, phonemes, diphones, triphones, and/or senones. In some embodiments, the local ASR system may be a full ASR system capable of processing utterances in at least one language.

Some wakeword-detection systems described herein include neural networks to process audio data. A neural network is a computer program that includes a plurality of nodes that process an input and produce an output in accordance with one or more weights. The neural network may be trained using training data, as described in greater detail below. A wakeword-detection system may use a convolutional neural network (CNN) to process data representing speech, which may include convolution functions, as explained in greater detail below. A wakeword-detection system may alternatively or further include a deep neural network (DNN), which may include one or more hidden layers. A CNN and a DNN are examples of a "feedforward" neural network in that, while each node in a layer of the network may be connected to each and every node in a preceding or subsequent layer (e.g., a "fully connected" neural network), the feedforward neural network does not include any connections that loop back from a node in a layer to a previous layer. A neural network that includes such "recurrent" connections is called a recurrent neural network (RNN).

For many user devices, power consumption is a major concern. A wakeword-detection component may consume an unacceptable amount of power, causing undesirable expense and/or undesirable drain on a power source, such as a battery. In particular, a wakeword-detection component capable of detecting different wakewords of different lengths may require more power than a user device can provide or afford. Such a component may use a first model or other type of processing component to determine that audio data represents the wakeword and a second model or other type of processing component to determine a first time at which the wakeword began to be spoken—a "beginpoint"—and a second time at which the wakeword ceased being spoken—an "endpoint." The beginpoint and endpoint may be sent, along with the audio data and an indication that the user device detected the wakeword in the audio data, to the remote system for further processing. The remote system may further process the audio data to verify that the wakeword is indeed represented in the audio data. The remote system may possess more processing resources compared to the user device (e.g., a larger, faster neural network) that may more accurately determine if the audio data includes the representation of the wakeword.

Embodiments of the present disclosure thus include a single neural network, such as a CNN, DNN, or RNN, that determines that audio data includes a representation of the wakeword, the beginpoint of the wakeword, and the endpoint of that wakeword. The neural network may receive, as input, a "window" of audio data; this window may include a number of units of audio data, such as frames of audio data, which represent a fixed length of time of received audio. For example, a frame of audio data may represent 10 milliseconds of received audio. The frame of audio data may be a time-domain representation of the magnitude and phase of the received audio. The frame of audio data may instead be or include a representation of processed received audio, which may be, for example, a frequency-domain representation of the received audio and/or a spectrogram (such as a Mel-cestrum) of the received audio. The window may include a plurality of frames, such as 80 frames, and may thus correspond to a larger duration of received audio, such as 800 milliseconds.

The neural network may receive and process a window of audio data. The neural network may receive and process overlapping windows of audio data; for example, the neural network may receive and process an 80-frame window of audio data every 1, 2, or 5 frames. That is, if the neural network processes a new window every frame, a first window includes frames 1-80, a second window includes frames 2-81, and so on.

The neural network may, as described in further detail below, include a plurality of layers of fully connected nodes that each process the window of audio data in accordance with one or more trained weights. The neural network may further include one or more output layers, such as softmax or sigmoid layers, which determine one or more outputs of the neural network. A softmax layer may receive outputs from previous layers of the neural network and may normalize the outputs such that they lie on a probability distribution between two known values, such as 0 and 1, and also such that the values of the probability distribution add up to a known sum, such as 1. The outputs of the softmax layer may then be compared to a threshold value, such as 0.8, to determine a yes-or-no decision, such as if audio data represents a wakeword or if a point in time represents a beginpoint or endpoint. A sigmoid layer may apply a sigmoid function to layers of the neural network; a sigmoid function modifies a value of an output such that values that lie in the middle of a range (e.g., values near 0.5 for a range of 0.0-1.0) increase or decrease to lie closer to the ends of the range. Such a sigmoid function may be used to more accurately make a yes-or-no decision, such as detection of the wakeword.

In various embodiments, the neural network determines that a window of audio data includes a representation of the wakeword that is right-aligned; as the term is used herein, "right alignment" refers to the case in which the window includes the representation of the wakeword in a portion of the window corresponding to frames most recently added to the window or "newest" frames. In other words, when the neural network determines the right-alignment case, it has determined that the audio data indicates that user has just finished speaking sounds that correspond to a wakeword, such as "Alexa," but has not yet determined that these sounds do not correspond to the first part of a longer word, such as "Alexander." The neural network may also determine that the window of audio data includes a representation of the wakeword that is center-aligned; as the term is used herein, "center alignment" refers to the case in which the window includes the representation of the wakeword when the window includes a representation of the wakeword surrounded by at least some frames that separate the beginning and end of the wakeword from other words or sounds. The neural network may also determine that the window of audio data includes a representation of the wakeword that is left-aligned; as the term is used herein, "left alignment" refers to the case in which the window includes the representation of the wakeword in a portion of the window corresponding to frames least recently added to the window or "oldest" frames. The neural network may also determine that the window of audio data includes a partial representation of the wakeword that is right-aligned; as the term is used herein, "partial right alignment" refers to the case in which the window includes the partial representation of the wakeword in a portion of the window corresponding to the newest frames. An example partial representation of the wakeword is "Alex"; subsequent frames may include a representation of the remainder of the wakeword, other words, or silence. The neural network may determine outputs (using, e.g., the softmax layer) corresponding to determination of the right alignment, center alignment, left alignment, and/or partial right alignment. When these outputs cross a threshold, the user device may determine that the audio data includes a representation of the wakeword and may send the audio data, indication of detection of the wakeword, the endpoint, and/or the beginpoint to the remote system.

FIG. 1 illustrates a device 110 for detecting a wakeword. Although the figures and discussion illustrate certain operational steps of the system in a particular order, the steps described may be performed in a different order (as well as certain steps removed or added) without departing from the intent of the disclosure. A device 110 local to a user 10 may communicate across the network 199 with a system 120. The device 110 may receive input audio 15 from a user 10 and may perform, using a neural network, wakeword detection using the input audio 15. The device 110 may further determine, using the same neural network, a beginpoint and an endpoint of the wakeword. If a wakeword is detected, the device 110 may further send audio data representing the input audio 15 to the system 120 via the network 199. The device 110 may use the beginpoint and endpoint to determine the audio data and/or may send indications of the beginpoint and endpoint to the system 120. The system 120 may verify detection of the wakeword using the beginpoint and endpoint and may perform additional speech processing (e.g., ASR and NLU), using a language-specific speech-processing component, on the audio data to determine output data responsive to an utterance represented in the audio data. The device 110 may receive the output data from the system 120 and output content corresponding to the output data.

In some embodiments, with reference to FIG. 1, the device 110 may receive (130), from at least one microphone, audio data representing an utterance. The audio data may include samples; each sample may be a number that represents a property, such as an amplitude, of audio received by a microphone of the device 110. The number of samples per unit of audio (e.g., per second of audio) may be determined by a sampling rate, such as 44,000 samples per second (e.g., 44 kHz). The samples may be grouped in audio frames; each frame may include, for example, 440 samples (corresponding to 10 milliseconds of audio).

The device 110 determines (130) that a first output of a neural network indicates that first audio data includes a first representation of a wakeword. This first audio data may be a first set of frames (e.g., a first window) having a first size (e.g., 100 frames corresponding to 1 second of audio); the first representation of the wakeword may correspond to most-recently determined frames of audio data. If the window is depicted as a left-to-right arrangement of frames, and new frames appear on the right side of the window, the first output corresponds to right alignment of the representation of the wakeword.

The device 110 determines (132), based on the first output, an endpoint of the first representation. The first output may, for example, be a first output of the neural network trained to be one value (e.g., 0.0) when the wakeword is not right aligned, and a second value (e.g., 1.0) when the wakeword is right-aligned. The device 110 may compare the first output to a threshold (e.g., 0.9) and determine that the endpoint is associated with the time the first output crossing the threshold (e.g., the time associated with the corresponding frame).

The device 110 determines (134) that a second output of the neural network indicates that second audio data (which may be a second set of frames of size similar to or same as that of the first set—e.g., a second window) corresponds to the wakeword. The second output may similarly range between two values, such as 0.0 and 1.0, and increase to 1.0 when the second audio data corresponding to the wakeword data is indicated. The second output may similarly be compared to a threshold (e.g., 0.9). The second output may cross the threshold at a second time occurring after a first time that the first output increases past the threshold.

The device 110 determines (136) that a third output of the neural network indicates that third audio data (which may be a third set of frames of size similar to or same as that of the first set and second set) includes the first representation of a wakeword. The device 110 determines (138), based on the third output, a beginpoint of the first representation. The device 110 sends (140), to a remote system, audio data and/or a first indication of the endpoint and a second indication of the beginpoint.

Referring to FIG. 2, the device 110 may receive the input audio 15 using an audio capture component, such as a microphone or array of microphones. Before performing wakeword detection (e.g., activating one or more wakeword-detection components), the device 110 may use various techniques to first determine whether the first audio data includes speech. For example, the device 110 may use a voice activity detection (VAD) component 220 to apply the VAD techniques. Such VAD techniques may determine whether speech is present in the first audio data based on various quantitative aspects of the first audio data, such as the spectral slope between one or more frames of the first audio data, the energy levels of the first audio data in one or more spectral bands the signal-to-noise ratios of the first audio data in one or more spectral bands; or other quantitative aspects. In other examples, the VAD component 220 may be a trained classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the first audio data to one or more acoustic models in speech storage, which acoustic models may include models corresponding to speech, noise (e.g., environmental noise or background noise), or silence. Still other techniques may be used to determine whether speech is present in the first audio data. In various embodiments, the VAD component 220 consumes less power than the wakeword-detection component, which begins processing audio data (and hence consuming power) only when the VAD component determines that the audio data likely represents speech. In other embodiments, the wakeword-detection component processes all received audio data, and the VAD component 220 is not present or not used.

If the VAD component 220 determines the audio data includes speech, a wakeword-detection component 222 may process the audio data to determine if a wakeword is likely represented therein. In other embodiments, the user device 110 does not include the VAD component 220, and the wakeword detection component 222 continually processes the audio data. A beginpoint/endpoint determination component 224 may be used to determine a beginpoint and endpoint of the wakeword in the audio data. Following detection of the wakeword, the device 110 sends audio data 211, corresponding to at least an utterance following the wakeword in the audio data, to the system 120, with indication of detection of the wakeword, the beginpoint, and/or the endpoint. The device 110 may further include an ASR component for determining speech represented in the input audio 15.

The wakeword-detection component 222 may process the audio data using trained models to detect a wakeword. The trained models may be CNNs, RNNs, acoustic models, hidden Markov models (HMMs), and/or classifiers. One approach for wakeword detection applies general large vocabulary continuous speech recognition (LVCSR) systems to decode the audio signals, with wakeword searching conducted in the resulting lattices or confusion networks. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding may be used to search the best path in the decoding graph, and the decoding output is further processed to make the decision on wakeword presence. This approach can be extended to include discriminative information by incorporating a hybrid DNN-HMM decoding framework. In another example, the wakeword-detection component 222 may use convolutional neural network (CNN)/recursive neural network (RNN) structures directly, without using a HMM. The wakeword-detection component 222 may estimate the posteriors of wakewords with context information, either by stacking frames within a context window for a DNN, or using a RNN. Follow-on posterior threshold tuning or smoothing may be applied for decision making. Other techniques for wakeword detection may also be used.

After wakeword detection and upon receipt by the system 120, the audio data 211 may be sent to an orchestrator component 230. The orchestrator component 230 may include memory and logic that enables the orchestrator component 230 to transmit various pieces and forms of data to various components of the system.

The orchestrator component 230 sends the audio data 211 to a speech-processing component 240. The speech-processing component 240 may include different components for different languages. One or more components may be selected based on determination of one or more languages. A selected ASR component 250 of the speech processing component 240 transcribes the audio data 211 into text data representing one more hypotheses representing speech contained in the audio data 211. The ASR component 250 interprets the utterance in the audio data 211 based on a similarity between the utterance and pre-established language models. For example, the ASR component 250 may compare the audio data 211 with models for sounds (e.g., subword units, such as phonemes, etc.) and sequences of sounds to identify words that match the sequence of sounds spoken in the utterance represented in the audio data 211. The ASR component 250 sends (either directly or via the orchestrator component 230) the text data generated thereby to a corresponding selected NLU component 260 of the speech processing component 240. The text data output by the ASR component 250 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

The NLU component 260 attempts, based on the selected language, to make a semantic interpretation of the phrases or statements represented in the text data input thereto. That is, the NLU component 260 determines one or more meanings associated with the phrases or statements represented in the text data based on individual words represented in the text data. The NLU component 260 determines an intent (e.g., a system action that a user desires the system to perform) representative of text data as well as pertinent pieces of information in the text data that allow a device (e.g., the device 110, the system 120, etc.) to execute the intent. For example, if the text data corresponds to "play Africa by Toto," the NLU component 1060 may determine a user intended the system to output the song Africa performed by the band Toto, which the NLU component 260 determines is represented by a <PlayMusic> intent.

The orchestrator component 230 (or another component of the system 120) may send NLU results data to a speechlet component 290 associated with the intent. The speechlet component 290 determines output data based on the NLU results data. For example, if the NLU results data includes intent data corresponding to <PlayMusic> and tagged text corresponding to <Artist: Toto>, the orchestrator 230 (or other component of the system 120) may send the NLU results data to a music speechlet component, which determines Toto music audio data for output by the system.

A "speechlet" may be software running on the system 120 that is akin to an application. That is, a speechlet may enable the system 120 to execute specific functionality in order to provide data or produce some other output requested by the user 10. The system 120 may be configured with more than one speechlet. For example, a weather speechlet may enable the system 120 to provide weather information, a ride-sharing speechlet may enable the system 120 to book a trip with respect to a taxi or ride sharing service, and a food-order speechlet may enable the system 120 to order a pizza with respect to a restaurant's online ordering system.

In some instances, a speechlet 290 may provide output text data responsive to received NLU results data. The system 120 may include a text-to-speech (TTS) component 280 that generates output audio data from speechlet provided output text data. The TTS component 280 may use different synthesis techniques. In one method of synthesis, called unit selection, the TTS component 280 analyzes text data against a database of recorded speech. The TTS component 280 selects units of recorded speech matching the text data and concatenates the units together to form output audio data. In another method of synthesis called parametric synthesis, the TTS component 280 varies parameters such as frequency, volume, and noise to create output audio data including an artificial speech waveform. Parametric synthesis uses a computerized voice generator, sometimes called a vocoder. In another method of speech synthesis, a trained model called a sequence-to-sequence model directly generates output audio data based on the input text data.

The system 120 may include a user-recognition component 295. The user-recognition component 295 may receive the audio data 211 and/or text data output by the ASR component 250. The user-recognition component 295 may determine scores indicating whether the speech represented in the audio data 211 originated from a particular user. For example, a first score may indicate a likelihood that the speech originated from a first user and a second score may indicate a likelihood that the speech originated from a second user. The user-recognition component 295 may also determine an overall confidence regarding the accuracy of user recognition operations. The user-recognition component 295 may perform user recognition by comparing audio characteristics in the audio data 211 to stored audio characteristics of users. The user-recognition component 295 may also perform user recognition by comparing biometric data (e.g., fingerprint data, iris data, etc.) received by the system in correlation with the audio 15 to stored biometric data of users. The user-recognition component 295 may further perform user recognition by comparing image data (e.g., including a representation of at least a feature of a user) received by the system in correlation with the audio 15 with stored image data (e.g., including representations of features of users). The user-recognition component 295 may perform additional user recognition processes. Output of the user-recognition component 295 may be used to inform NLU processing as well as processing performed by speechlets 290.

The system 120 may include a user-profile storage 270. The user profile storage 270 may include a variety of information related to individual users and/or groups of users that interact with the system 120. The user-profile storage 270 may include one or more user profiles. Each user profile may be associated with a different user ID. A user profile may be an umbrella profile specific to one or a group of users. That is, a user profile may encompass two or more individual user profiles, each associated with a respective user ID. For example, a user profile may be a household profile that encompasses user profiles associated with multiple users of a single household. A user profile may include preferences shared by all the user profiles encompassed thereby. Each user profile encompassed under a single user profile may include preferences specific to the user associated therewith. That is, each user profile may include preferences unique from one or more other user profiles encompassed by the same user profile. A user profile may be a stand-alone profile or may be encompassed under another user profile. As illustrated, the user profile storage 270 is implemented as part of the system 120. The user profile storage 270 may, however, may be disposed in a different system in communication with the system 120, for example over the network 199. User-profile data may be used to inform NLU processing as well as processing performed by a speechlet 290.

As described above, the wakeword-detection component 222 may implement device specific and/or user specific machine learned models. One or more machine learned models may, however, be trained using both device specific speech-processing data and user specific speech processing data. The more data types used to train a machine learning model, the more accurate a resulting trained model may be in predicting whether the wakeword detection sensitivity should be lowered. For example, other data that may be used to train a machine learning model includes a type of the device 110 or a location of the device 110 (e.g., a geographic location or a location with a building).

Users may speak a first wakeword followed by a first command to a device and thereafter speak a second wakeword followed by a second command to the device. Moreover, an intent of the first command may indicate to the system that the device is likely to receive the second wakeword and second command. For example, a user may routinely say "Alexa, play [artist name]," with "Alexa" corresponding to a first wakeword and "play [artist name]" corresponding to a <PlayMusic> intent. After a user speaks such, it may be that the user says "Alexa, [increase or decrease] the volume," with "Alexa" corresponding to a second wakeword and "play [increase or decrease] the volume" corresponding to a <ChangeVolume> intent. Because the user routinely speaks the command corresponding to the <ChangeVolume> intent after the user speaks the command corresponding to the <PlayMusic> intent, the system 120 may infer that the wakeword detection sensitivity should be lowered when the system determines a command corresponding to a <PlayMusic> intent.

In some implementations, the system 120 may receive input audio data from the device 110 as well as receive indications from the device 110 that the device 110 detected a wakeword and that the wakeword corresponds to a language. The system 120 may perform processes to confirm that the wakeword is present in the input audio data using a model trained using data accessible to the system 120. This may be beneficial if the device 110 performs unreliable wakeword detection or, at least, less-reliable wakeword detection than the system 120.

The aforementioned models and other models described herein may be trained and operated according to various machine-learning techniques. Such techniques may include, for example, neural networks (such as convolutional neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. For example, a SVM is a supervised learning model with associated learning algorithms that analyze data and recognize patterns in the data and may be used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine-learning techniques, machine learning processes themselves need to be trained. Training a machine learning component may include establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. During training, the training data may be applied to a model and the output of the model may be evaluated for its accuracy in producing the expected output specified by the training data. The model may be updated in accordance with, for example, a gradient-descent algorithm, in which one or more weights of the model are back filled.

The user profile storage 270 includes data regarding individual user profiles. Each user profile may include information indicating various devices, output capabilities of each of the various devices, and/or a location of each of the various devices. The device-profile data represents a profile specific to a device. For example, device profile data may represent various user profiles that are associated with the device, speech processing that was performed with respect to audio data received from the device, instances when the device detected a wakeword, etc. In contrast, user-profile data represents a profile specific to a user.

FIG. 3A illustrates components of the device 110 in accordance with the present disclosure, of which further disclosure is provided later figures. In various embodiments, the device 110 receives input audio data 302 that potentially represents an utterance by the user 10 and which may also represent a wakeword. The input audio data 302 may be digital data that represents a time-domain or frequency-domain audio signal. In other embodiments, the input audio data 302 is data that has been processed using, for example, an acoustic model, and represents acoustic units and/or audio features of the digital data.

A VAD component 220 may receive and process the input audio data 302 using the techniques described above. In accordance with those techniques, the VAD component 220 may determine that the input audio data 302 likely includes a representation of speech. If this determination is made, the VAD component 220 may send corresponding speech-related audio data, referred to herein as speech audio data 304, to a wakeword-detection component 222. As noted above, however, in some embodiments, the device 110 does not include and/or does not use the VAD component 220; in these embodiments, the wakeword-detection component 222 processes the input audio data 302 continually and not only when the VAD component 220 determines that the input audio data 302 likely includes a representation of speech. As discussed in greater detail herein, the wakeword-detection component 222 outputs one or more wakeword-detection determinations, which include a left-aligned wakeword-detection determination 306, a center-aligned wakeword-detection determination 308, a right-aligned wakeword-detection determination 310, and/or a partial right-aligned wakeword-detection determination 316. Based on these determinations, the device 110 may determine that the speech audio data 304 includes a representation of the wakeword and a beginpoint and endpoint of the wakeword.

FIG. 3B illustrates additional details of the wakeword-detection component 222. As described above, the wakeword-detection component 222 may include one or more CNN/DNN layers 312, which may be fully connected layers in that each node in a layer 312 is connected to every node in a preceding or subsequent layer 312. The wakeword-detection component 222 may further include one or more output layers 314 (which may include softmax and/or sigmoid layers) that produce the determinations 306, 308, 310, 316. The wakeword-detection component 222 may include other types of layers or functions, such as a sigmoid layer or function.

The CNN which may include two or more convolutional blocks. The CNN may include a number of layers. A bottom convolutional layer may input the audio data 802 and with a stride of (2,1) (meaning the layer may skip an output every two timestamps). The CNN then may have a max pooling layer with a stride of (2,2) resulting in a 2× time dimensionality reduction and a 2× frequency reduction. The result of the max pooling is then processed by the next two convolutional blocks/residual network blocks (e.g., Cony 3×3, 64), the output of which is then processed by the next two convolutional blocks (Cony 3×3, 128). An average pooling block may then be used to further reduce the dimensionality before feeding into a bi-directional gated recurrent unit (GRU) layer to produce the audio feature data 806. The audio feature vectors 404 may have a time scale of 186 milliseconds, e.g., eight times the resolution of an input spectrogram. The number of units in the feature data may correspond to the number of units in the bi-directional GRU layer of the CRNN.

Figure 4:
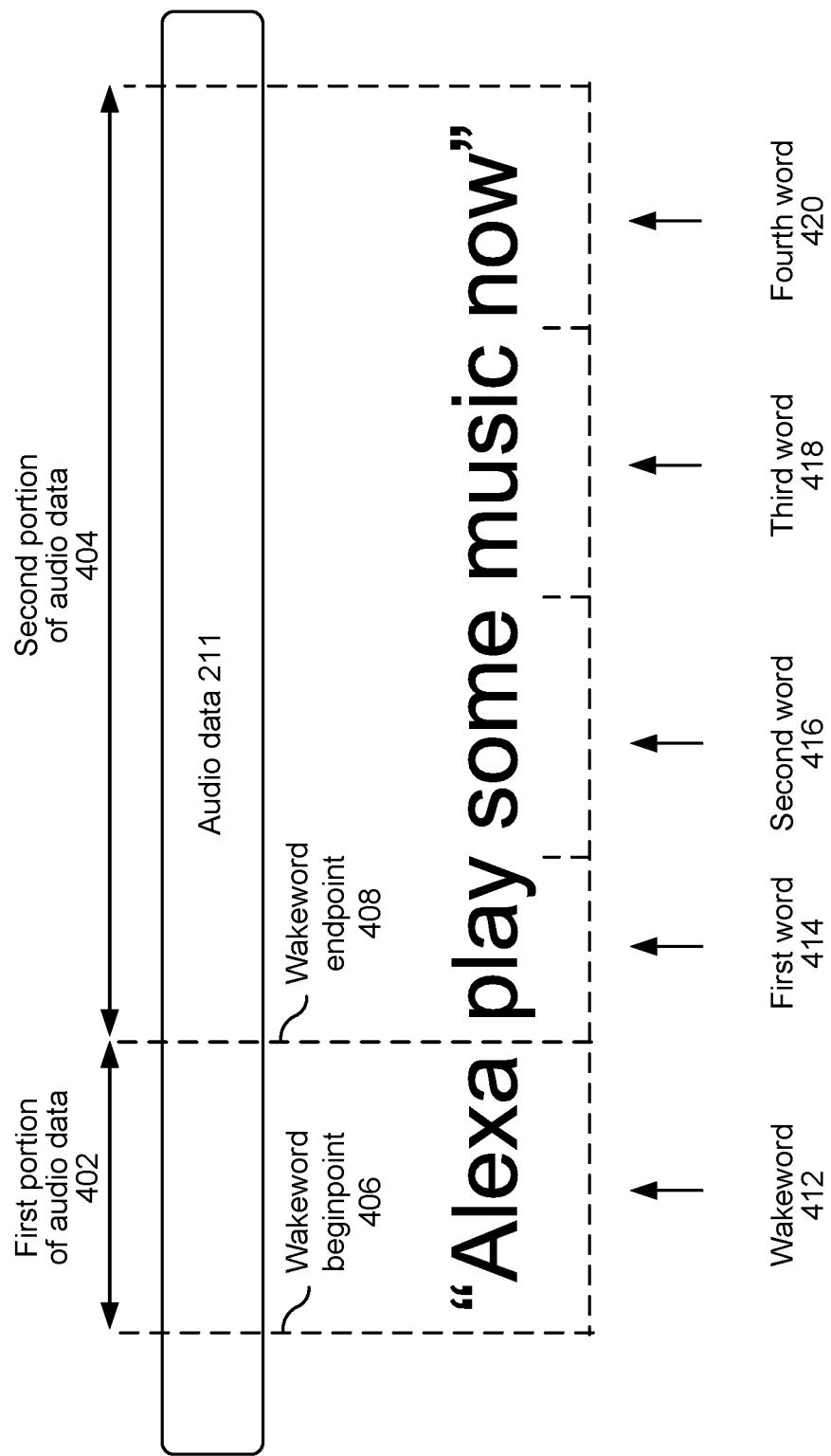
FIG. 4 illustrates audio data representing speech in accordance with embodiments of the present disclosure.

FIG. 4 illustrates audio data 211 having a first portion 402—i.e., first audio data—and a second portion 404—i.e., second audio data. The first portion 402 includes a representation of a wakeword 412; the second portion includes additional words 414, 416, 418, 420. A beginpoint 406 marks the beginning of the first portion 402 of the audio data 211, and an endpoint 408 marks the end of the first portion 402 of the audio data 211. As discussed above, the first portion 402 of the audio data 211 may represent a wakeword and may be used as reference audio data, and the second portion 404 of the audio data 211 may represent a request or command. In some embodiments, such as in a non-wakeword system or in an utterance that is part of an ongoing session with the system, the first portion 402 of the audio data 211 does not represent a wakeword; in other embodiments, the first portion 402 of the audio data 211 includes reference audio data taken from a previous recording of a desired speaker.

Figure 5B:
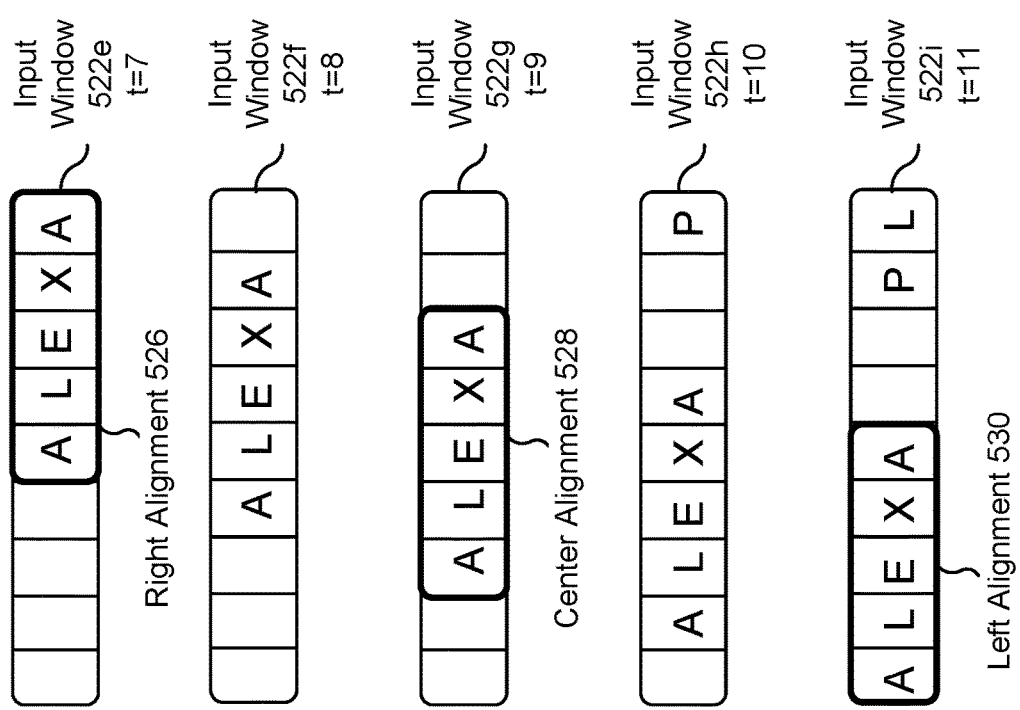

FIGS. 5A and 5B illustrate frames 520 of audio data and corresponding windows 522a—i of audio data for input to and processing by the wakeword component 222. In this illustration, the frames 520 begin at a time t=0 and end at a time t=11; nine input windows 522a—i, each nine frames in length, begin at times t=3-11. FIGS. 5A and 5B are, however, provided for illustration only, and the present disclosure is not limited to only these examples. The frames 520 may be of any size and may include any number of samples; the input windows 522a—i may similarly be any size. Further, each syllable of the wakeword may correspond to one or more frames, and each letter of the wakeword may not correspond to only its own frame. That is, the "E" and "X" of "Alexa" may correspond to a number of frames that include a representation of the phone "eks."

As described above, each frame of the frames 520 may include a number of samples and may represent audio properties, such as amplitude, of a unit of time of audio sensed by a microphone of the device 110. As the microphone receives audio, the device 110 creates successive frames of audio data. Thus, if each frame corresponds to 10 milliseconds of audio, and if a first frame represents audio sensed between 0-10 milliseconds, a second frame represents audio between 10-20 milliseconds, and so on.

The first input window 522a illustrates that the first character of the wakeword "Alexa," as occurring in the input frames 520 of audio data, appears on the rightmost side of the first input window 522a. As further frames are received, the wakeword progress through the next input windows 522b and 522c. An output of the wakeword detector 222 may indicate that a first portion of the wakeword is partially right aligned 524. That is, the neural network may be trained using data representing the appearance of the first portion of the wakeword on the right-hand side of the input window 522.

The wakeword progresses further through additional input windows 522e and 522f. The wakeword is right aligned 526 when the entire wakeword is present in the input window 522 at the far right-hand side of the input window 522. An output of the wakeword detector 222 may indicate that the wakeword is right aligned 526. That is, the neural network may be trained using data representing the appearance the wakeword on the right-hand side of the input window 522.

The wakeword progresses further through additional input windows 522d and 522e. The wakeword is right aligned 526 when the entire wakeword is present in the input window 522 at the far right-hand side of the input window 522. An output of the wakeword detector 222 may indicate that the wakeword is right aligned 526. That is, the neural network may be trained using data representing the appearance the wakeword on the right-hand side of the input window 522.

The wakeword progresses further through additional input windows 522f and 522g. The wakeword is center aligned 528 when the wakeword is present in the input window 522 at the center of the input window 522. An output of the wakeword detector 222 may indicate that the wakeword is center aligned 528. That is, the neural network may be trained using data representing the appearance the wakeword in the center of the input window 522.

The wakeword progresses further through additional input windows 522h and 522i. The wakeword is left aligned 530 when the wakeword is present in the input window 522 at the left of the input window 522. An output of the wakeword detector 222 may indicate that the wakeword is left aligned 530. That is, the neural network may be trained using data representing the appearance the wakeword on the left-hand side of the input window 522.

In some embodiments, as described above, the neural network is trained to have multiple outputs. The neural network thus may be trained using data having the wakeword in the various positions in the input window described above and updating using multi-target training.

Figure 6A:
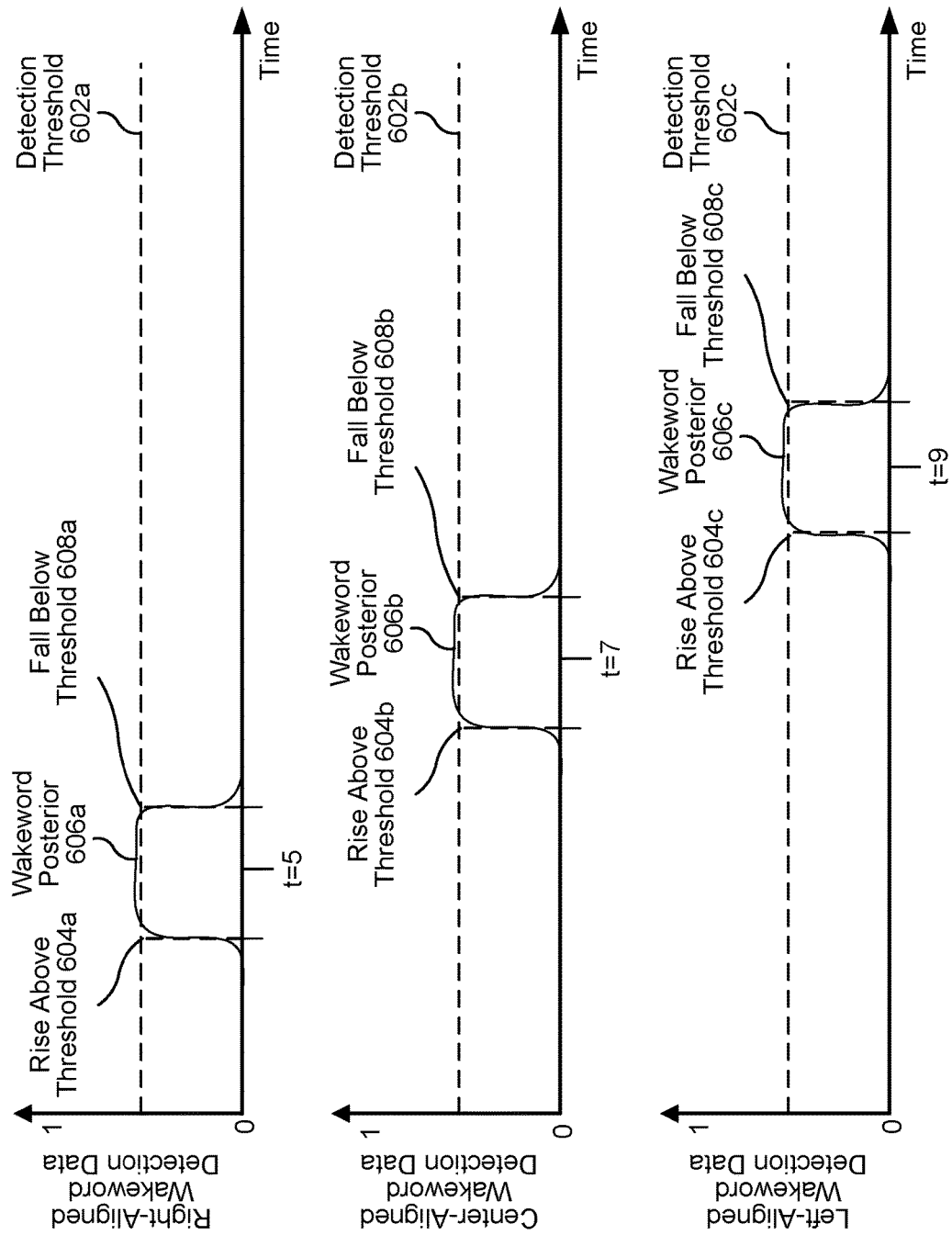
FIGS. 6A and 6B illustrate detecting a wakeword in accordance with embodiments of the present disclosure.
Figure 6B:
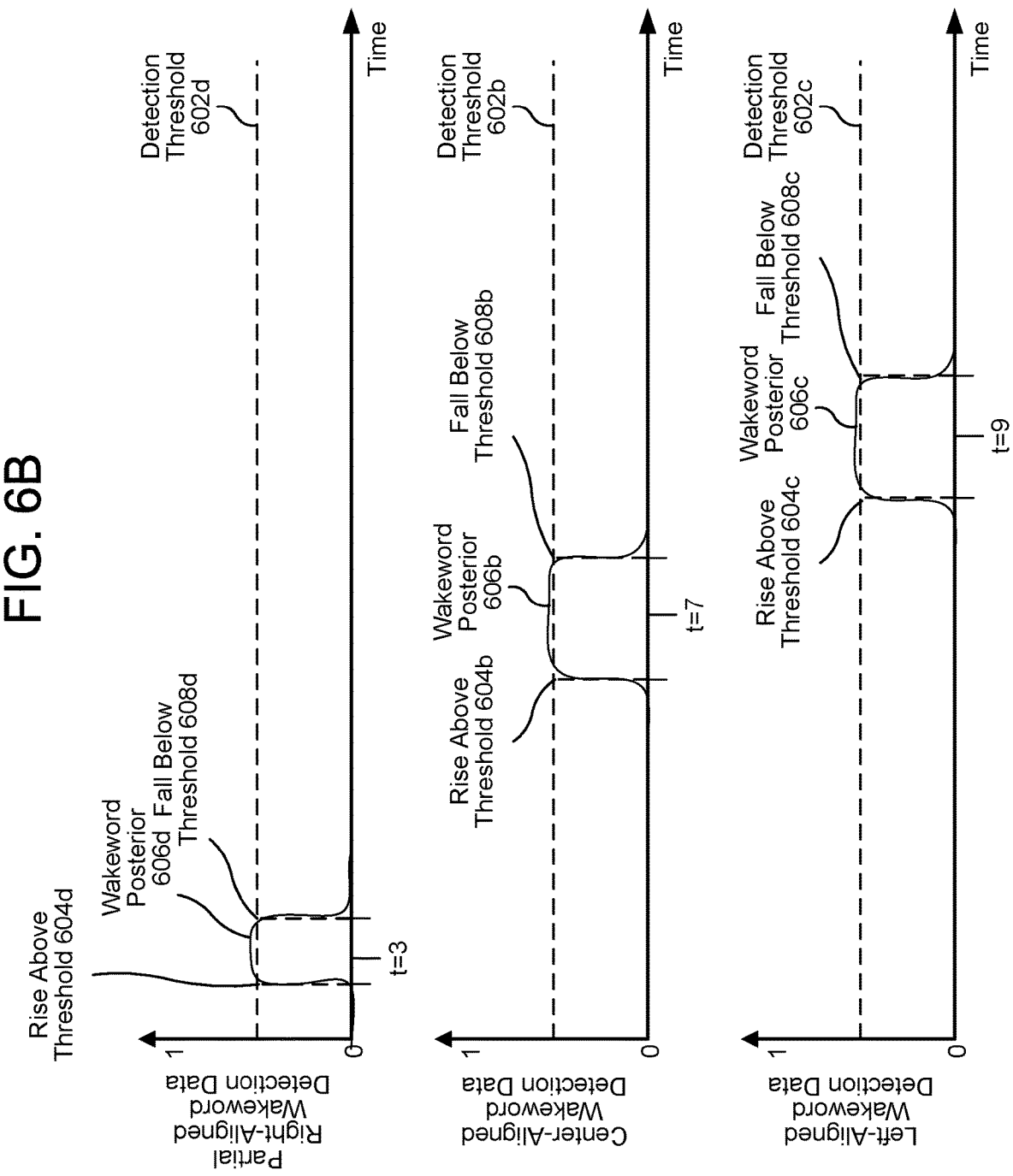

FIGS. 6A and 6B illustrate various outputs of the wakeword component 222. Right-aligned wakeword detection data may include a wakeword posterior 606a that indicates when the wakeword is aligned on the right side of the window 522. A detection threshold 602a may be determined (by, e.g., experimentation). When the wakeword posterior 606a rises above 604a the threshold 602a, the right-aligned wakeword detection determination 310 may indicate that the wakeword is right-aligned 526. This indication may cease when the posterior 606a falls below 608a the threshold 602a.

Similarly, center-aligned wakeword detection data may include a wakeword posterior 606b that indicates when the wakeword is aligned in the center of the window 522. A detection threshold 602b may be determined (by, e.g., experimentation). When the wakeword posterior 606b rises above 604b the threshold 602b, the center-aligned wakeword detection determination 308 may indicate that the wakeword is center-aligned 528. This indication may cease when the posterior 606b falls below 608b the threshold 602b.

Likewise, left-aligned wakeword detection data may include a wakeword posterior 606c that indicates when the wakeword is aligned on the left side of the window 522. A detection threshold 602c may be determined (by, e.g., experimentation). When the wakeword posterior 606c rises above 604c the threshold 602c, the left-aligned wakeword detection determination 310 may indicate that the wakeword is left-aligned 526. This indication may cease when the posterior 606c falls below 608c the threshold 602c. FIG. 6B indicates that partial right-aligned wakeword detection data may similarly have a posterior 606d and a threshold 602d denoting when the posterior 606d rises above 606d and falls below 608 it.

Using this data, the beginpoint/endpoint determination component 224 may determine the beginpoint and/or endpoint. The beginpoint/endpoint determination component 224 may determine the endpoint as a time that the right-aligned wakeword detection determination 310 indicates that the wakeword is right-aligned. In the example of FIGS. 5A and 5B, the endpoint is 5. The beginpoint/endpoint determination component 224 may determine the beginpoint as a difference between the time that the left-aligned wakeword detection determination 306 indicates that the wakeword is left-aligned and a time representing a duration of the window 522. In the example of FIGS. 5A and 5B, the window is 9 frames in length, and the time of the left-aligned wakeword detection determination 306 is also 9, so the beginpoint is 0.

In some embodiments, the duration of the wakeword is approximately equal to the size of the window 522 or slightly less than the size of the window 522. In these embodiments, when the partially right-aligned wakeword detection determination output of the wakeword component determines partial right alignment of the wakeword, the left-hand side of the wakeword is approximately in the center of the window 522. Thus, the beginpoint may be determined by the difference between half the duration of the window 522 and the time of detecting the partial right alignment. This detection of the wakeword may be used as a first-pass wakeword detection system that, when it detects the wakeword, processes the audio data a more accurate second-pass wakeword detection system.

As mentioned above, the remote system 120 may, upon receipt of the beginning of the audio data 211, perform a verification operation to verify that the audio data 211 includes the representation of the wakeword. The remote system 120 may include a neural-network model configured as a classifier that receives a portion of the audio data 211 as input and makes a yes-or-no determination regarding the presence of the representation of the wakeword. The portion of the audio data 211 may be approximately two seconds long. The portion of the audio data 211 may begin at a point in time prior to the representation of the wakeword; in some embodiments, 500 milliseconds prior to the representation of the wakeword. If the classifier determines that the wakeword is not represented in the audio data 211, and if the device 110 is still sending further audio data, the remote system 120 may send, to the device 110, a command to cease sending the audio data.

Neural networks may be used to perform wakeword processing as described herein. An example neural network, which may be the CNN/DNN, is illustrated in FIG. 7A. The neural network may include nodes organized as an input layer 702, a hidden layer 704, and an output layer 706. The input layer 702 may include m nodes, the hidden layer 704 n nodes, and the output layer 706 o nodes, where m, n, and o may be any numbers and may represent the same or different numbers of nodes for each layer. Nodes of the input layer 702 may receive inputs, and nodes of the output layer 706 may produce outputs. Each node of the hidden layer 704 may be connected to one or more nodes in the input layer 702 and one or more nodes in the output layer 704. Although the neural network illustrated in FIG. 7A includes a single hidden layer 704, other neural network may include multiple middle layers 704; in these cases, each node in a hidden layer may connect to some or all nodes in neighboring hidden (or input/output) layers. Each connection from one node to another node in a neighboring layer may be associated with a weight or score. A neural network may output one or more outputs, a weighted set of possible outputs, or any combination thereof.

Figure 7B:
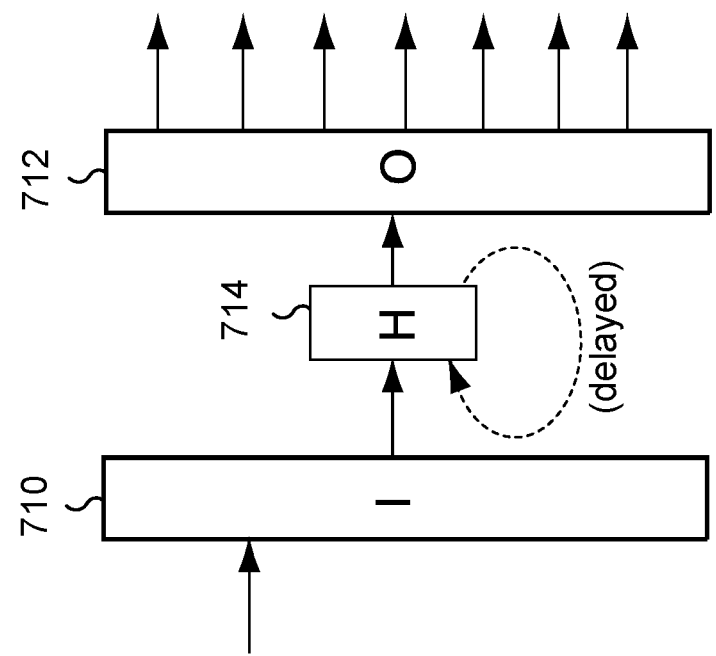

In one aspect, the neural network may be constructed with recurrent connections such that the output of the hidden layer of the network feeds back into the hidden layer again for the next set of inputs. Such a neural network is illustrated in FIG. 7B. Each node of the input layer 710 connects to each node of the hidden layer 714. Each node of the hidden layer 714 connects to each node of the output layer 712. As illustrated, the output of the hidden layer 714 is fed back into the hidden layer for processing of the next set of inputs. A neural network incorporating recurrent connections may be referred to as a recurrent neural network (RNN). Nodes of an RNN may be, for example, long short-term memory (LSTM) nodes or gated recurrent unit (GRU) nodes.

Processing by a neural network is determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with a lattice to improve speech recognition when the entire lattice is processed.

Processing by a neural network may be determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

FIG. 8 is a block diagram conceptually illustrating example components of the device 110. FIG. 9 is a block diagram conceptually illustrating example components of a remote device, such as the system 120, which may assist with ASR processing, NLU processing, etc. Multiple servers may be included in the system 120, such as one or more servers for performing ASR, one or more servers for performing NLU, etc. In operation, each of these devices (or groups of devices) may include computer-readable and computer-executable instructions that reside on the respective device (110/120), as discussed further below.

The device 110 and/or the system 120 may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. The device 110 and/or the system 120 may also include a data storage component (808/908) for storing data and controller/processor-executable instructions. Each data storage component (808/908) may individually include one or more non-volatile storage types such as magnetic storage, optical storage, solid-state storage, etc. The device 110 and/or the system 120 may also be connected to removable or external non-volatile memory and/or storage (such as a removable memory card, memory key drive, networked storage, etc.) through respective input/output device interfaces (802/902).

Computer instructions for operating the device 110 and/or the system 120 and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

The device 110 and/or the system 120 may include input/output device interfaces (802/902). A variety of components may be connected through the input/output device interfaces (802/902), as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Referring to FIG. 8, the device 110 may include input/output device interfaces 802 that connect to a variety of components such as an audio output component such as a speaker 822, a wired headset or a wireless headset, or other component capable of outputting audio. The device 110 may also include an audio capture component. The audio capture component may be, for example, a microphone 820 or array of microphones, a wired headset or a wireless headset, etc. The device 110 may additionally include a display 816 for visually presenting content and an antenna 814.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network 199, the system may be distributed across a networked environment. The I/O device interface (802/902) may also include communication components that allow data to be exchanged between devices such as different physical servers in a collection of servers or other components.

The components of the device 110 and the system 120 may include their own dedicated processors, memory, and/or storage. Alternatively, one or more of the components of the device 110 and the system 120 may utilize the I/O interfaces (802/902), processor(s) (804/904), memory (806/906), and/or storage (808/908) of the device 110 and system 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the system 120, as described herein, are illustrative, and may be located as a stand-alone device or may be included, in whole or in part, as a component of a larger device or system.

As illustrated in FIG. 10, multiple devices (110a-110g, 120, 1002, 1004) may contain components of the present disclosure and the devices may be connected over a network 199. The network 199 may include a local or private network or may include a wide-area network, such as the Internet. Devices may be connected to the network 199 through either wired or wireless connections. For example, a speech-controlled device 110a, a smart phone 110b, a refrigerator 110c, a tablet computer 110d, a desktop computer 110e, and/or laptop computer 110f may be connected to the network 199 through a wireless service provider, over a WiFi or cellular network connection, or the like. A microphone 1002 and a speaker 1004 may further be connected to the network 199. Other devices are included as network-connected support devices, such as the system 120, or others. The support devices may connect to the network 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving a first set of frames of audio data, a frame in the first set representing a portion of an utterance;
    processing the first set with a convolutional neural-network (CNN) to determine a first output;
    determining that the first output indicates a first subset of the first set of frames includes a representation of a wakeword;
    determining an endpoint of the wakeword corresponding to a first time that the first output crosses a threshold;
    receiving a second set of frames of the audio data, the second set of frames having at least one frame in common with the first set;
    processing the second set of frames with the CNN to determine a second output;
    determining that the second output indicates a second subset of the second set of frames includes the representation of the wakeword;
    determining a difference between a second time of the second output and a portion of a duration of the first set;
    determining, based at least on the difference, a beginpoint of the wakeword;
    based at least in part on determining the beginpoint of the wakeword, sending, to a remote system, a first indication of the beginpoint; and
    based at least in part on determining the endpoint of the wakeword, sending, to the remote system, a second indication of the endpoint.

2. The computer-implemented method of claim 1, further comprising:
    receiving a third set of frames of audio data;
    processing the third set with the CNN to determine a third output;
    determining that the third output indicates that the representation of the wakeword is in the third set; and
    sending, to the remote system, the audio data.

3. A computer-implemented method comprising:
    determining that a first output of a neural network indicates that first audio data includes a representation of a wakeword;
    determining, based on the first output, an endpoint of the representation;
    determining that a second output of the neural network indicates that second audio data includes at least part of the representation of the wakeword;
    determining that a third output of the neural network indicates that third audio data includes the representation of the wakeword;
    determining a difference between a time associated with the third output and a portion of a duration of a first set of audio frames;
    determining, based at least on the difference, a beginpoint of the representation;
    based at least in part on determining the beginpoint of the representation, sending, to a component, a second indication of the beginpoint; and based at least in part on determining the endpoint of the representation, sending, to the component, a first indication of the endpoint.

4. The computer-implemented method of claim 3, wherein:
the first audio data corresponds to the first set of audio frames,
the second audio data corresponds to a second set of audio frames,
determining the first output comprises determining a first alignment of the representation of the wakeword in the first set of audio frames, and
determining the second output comprises determining a second alignment of the representation of the wakeword in the second set of audio frames, the second alignment being different from the first alignment.

5. The computer-implemented method of claim 3, wherein:
the second audio data corresponds to the first set of audio frames.

6. The computer-implemented method of claim 3, further comprising:
receiving, from at least one microphone, input audio data;
determining a first frame representing a first portion of the input audio data;
determining a second frame representing a second portion of the input audio data; and
determining a third frame representing a third portion of the input audio data,
wherein the first audio data includes the first frame and the second frame, and
wherein the second audio data includes the second frame and the third frame.

7. The computer-implemented method of claim 3, wherein:
the neural network comprises a convolutional neural network,
determining the first output comprises normalizing, using a first softmax function at a first time, an output of the neural network,
determining the second output comprises normalizing, using a second softmax function at a second time after the first time, the output of the neural network, and
determining the third output comprises normalizing, using a third softmax function at a third time after the second time, the output of the neural network.

8. The computer-implemented method of claim 3, further comprising:
determining that a fourth output of the neural network indicates that fourth audio data includes a second representation of a portion of the wakeword;
determining a difference between a second time represented in the fourth output and half a duration of the first set of audio frames; and
determining, based on the difference, a second beginpoint of the second representation.

9. The computer-implemented method of claim 3, further comprising at least one of:
based on the second output, sending, to the component, audio data corresponding to the first audio data, the second audio data, and the third audio data; or
based on the first output, the second output, and the third output, sending, to the component, the audio data.

10. The computer-implemented method of claim 3, further comprising:
sending, to the component, audio data corresponding to the first audio data, the second audio data, and the third audio data; and
receiving, from the component, an indication that a portion of the audio data delimited by the beginpoint and the endpoint includes the representation of the wakeword.

11. The computer-implemented method of claim 3, wherein determining that the first output indicates that the first audio data includes the representation comprises:
receiving, from the neural network, an output of a softmax layer;
determining smoothed output data by smoothing the output; and
determining that the smoothed output data satisfies a condition.

12. A system comprising:
at least one processor; and
at least one memory including instructions that, when executed by the at least one processor, cause the system to:
determine that a first output of a neural network indicates that first audio data includes a representation of a wakeword;
determine, based on the first output, an endpoint of the representation;
determine that a second output of the neural network indicates that second audio data includes at least part of the representation of the wakeword;
determine that a third output of the neural network indicates that third audio data includes the representation of the wakeword;
determine a difference between a time associated with the third output and a portion of a duration of a first set of audio frames;
determine based on the difference a beginpoint of the representation;
based at least in part on determining the beginpoint of the representation, storing, in a memory component, a second indication of the beginpoint; and
based at least in part on determining the endpoint of the representation, storing, in the memory component, a first indication of the endpoint.

13. The system of claim 12, wherein the first audio data corresponds to the first set of audio frames, the second audio data corresponds to a second set of audio frames, and the at least one memory further includes instructions that, when executed by the at least one processor, further cause the system to:
determine a first alignment of the representation of the wakeword in the first set of audio frames, and
determine a second alignment of the representation of the wakeword in the second set of audio frames, the second alignment being different from the first alignment.

14. The system of claim 12, wherein the second audio data corresponds to the first set of audio frames.

15. The system of claim 12, wherein the at least one memory further includes instructions that, when executed by the at least one processor, further cause the system to:
receive, from at least one microphone, input audio data;
determine a first frame representing a first portion of the input audio data;
determine a second frame representing a second portion of the input audio data; and
determine a third frame representing a third portion of the input audio data, wherein the first audio data includes the first frame and the second frame, and wherein the second audio data includes the second frame and the third frame.

16. The system of claim 12, wherein the neural network comprises a convolutional neural network and the at least one memory further includes instructions that, when executed by the at least one processor, further cause the system to:
   normalize, using a first softmax function at a first time, an output of the neural network;
   normalize, using a second softmax function at a second time after the first time, the output of the neural network; and
   normalize, using a third softmax function at a third time after the second time, the output of the neural network.

17. The system of claim 12, wherein the at least one memory further includes instructions that, when executed by the at least one processor, further cause the system to:
   determine that a fourth output of the neural network indicates that fourth audio data includes a second representation of a portion of the wakeword;
   determine a difference between a second time represented in the fourth output and half a duration of the first set of audio frames; and
   determine, based on the difference, a second beginpoint of the second representation.

18. The system of claim 12, wherein the at least one memory further includes instructions that, when executed by the at least one processor, further cause the system to:
   based on the second output, send, to the memory component, audio data corresponding to the first audio data, the second audio data, and the third audio data; or
   based on the first output, the second output, and the third output, send, to the memory component, the audio data.

19. The system of claim 12, wherein the at least one memory further includes instructions that, when executed by the at least one processor, further cause the system to:
   send, to the memory component, audio data corresponding to the first audio data, the second audio data, and the third audio data; and
   receive, from the memory component, an indication that a portion of the audio data delimited by the beginpoint and the endpoint includes the representation of the wakeword.

20. The system of claim 12, wherein the at least one memory further includes instructions that, when executed by the at least one processor, further cause the system to:
   receive, from the neural network, an output of a softmax layer;
   determine smoothed output data by smoothing the output; and
   determine that the smoothed output data satisfies a condition.

* * * * *